United States Patent [19]

Bennett

[11] Patent Number: 4,813,390

[45] Date of Patent: Mar. 21, 1989

[54] AIR GAS MIXING DEVICE WITH VALVE POSITION DETECTOR

[76] Inventor: David E. Bennett, P.O. Box 52, Lake Lillian, Minn. 56253

[21] Appl. No.: 177,088

[22] Filed: Apr. 4, 1988

[51] Int. Cl.⁴ ............................................. F02B 7/00
[52] U.S. Cl. ..................................... 123/577; 123/527
[58] Field of Search ...................... 123/577, 527, 525; 48/184

[56] References Cited

U.S. PATENT DOCUMENTS

| | | | |
|---|---|---|---|
| 2,196,809 | 4/1940 | Hoadley | 177/351 |
| 2,427,866 | 9/1947 | MacGeorge | 171/119 |
| 2,985,854 | 5/1961 | Brosh | 336/30 |
| 3,545,948 | 12/1970 | Baverstock | 48/184 |
| 4,449,509 | 5/1984 | Young | 123/577 |
| 4,513,727 | 4/1985 | Lagano et al. | 123/525 |
| 4,694,811 | 9/1987 | Bennett | 123/527 |
| 4,703,742 | 11/1987 | Bennett | 123/577 |

OTHER PUBLICATIONS

Handbook of Measurement and Control, by Edward Herzeg 1976, Library of Congress Catalog No. 76-24971.

Primary Examiner—E. Rollins Cross

[57] ABSTRACT

An air-gas mixing device of the type used to mix air and gaseous fuel as a gaseous fuel charge for an internal combustion engine and having air and gaseous fuel valves for controlling the air-fuel mixture. For more optimum control of the air-fuel mixture, a linear variable differential transformer is coupled to each valve to detect the exact position of the valve at any particular engine operating condition and the detection is transmitted to a remote measuring instrument and control station. If the engine is not operating at its most optimum efficiency, the fuel valve may then be moved to a predetermined position relative to the air valve to provide this efficiency. Internal electrical wires of the device are connected to an external wiring harness through an interconnector in a manner to prevent contamination of interconnecting electrical contacts in a corrosive atmosphere or an explosion caused by arcing of the contacts during connection or disconnection in an explosive atmosphere. The interconnector is retained on the air inlet housing of the device in a manner which allows the housing to move relative to the interconnector without interfering with the electrical connection.

8 Claims, 2 Drawing Sheets

AIR GAS MIXING DEVICE WITH VALVE POSITION DETECTOR

This invention relates generally to air-gas mixing devices of the type used to mix air and gaseous fuel, such as LPG or natural gas, as a gaseous fuel charge for an internal combustion engine; and more particularly of the type having independently operated air and fuel valves.

Mixing devices for mixing air with a gaseous fuel are well known. Such a device is commonly attached, together with a butterfly valve, to an intake manifold of an internal combustion engine in lieu of a conventional liquid fuel carburetor when it is desired to operate the engine with gaseous fuel. In operation, the device typically mixes in a mixing chamber air and gaseous fuels in proper proportion for a particular engine load in response to engine intake manifold pressure, as an indicator of engine load requirements, and discharges the mixture into the intake manifold as an air-fuel charge. Air and gaseous fuel valves within the device control the amount and mixture of the air-fuel charge. In one such device shown in U.S. Pat. No. 3,545,948, the air and fuel valves are operated in unison by a diaphragm moved by a pressure control signal derived from the intake manifold pressure. In a another such device as shown in U.S. Pat. No. 4,694,811, the fuel valve is also independently operated by a stepper motor to adjust the fuel flow for any air valve setting for more optimum control of the air-fuel mixture.

A problem with such known devices is that when the devices are in operation, the exact position of the air and fuel valves cannot be determined since the valves are not visible. Knowledge of the position of the air and fuel valves for any particular engine operating condition is important in monitoring the amount of fuel to be mixed with the air for an optimum air-fuel mixture. It is also important to know the exact position of the valves in order to quickly adjust the fuel valve opening or position for any given air valve position when changing from one gaseous fuel to another having a different BTU content during the course of engine operation. For example, it is not uncommon when operating an industrial stationary engine to operate the engine on both land fill gas and natural gas which has a higher BTU content. When land fill gas is switched to natural gas, the fuel supply must be reduced to adjust the air/fuel ratio for an equivalent BTU mixture. Since by experiment, the position to which the fuel valve must be moved to provide such an equivalent air-fuel mixture is known, the fuel valve is moved to such a predetermined position upon the change of fuel. In U.S. Pat. No. 4,694,811, this is accomplished by moving the fuel valve independently by an electrical signal to the stepper motor. Unfortunately, however, the degree to which the fuel valve is actually moved by such a signal cannot be precisely determined as desired due to inherent resistance in the movement Of the stepper motor and connected fuel valve caused by friction or due to a variance in the strength of the electrical pulse signal to the motor.

It is also helpful to know the position of the air-valve when setting the spark plug timing for the engine. Other important reasons also exist for knowing the exact location of the air and/or fuel valves.

An attempt has been made to determine the position of the air and fuel valves by optical scanning the movement of the valves or by detecting the movement through the use of a variable resistance potentiometer, but these attempts have failed because of contamination in the ambient environment preventing a reliable optical reading and, with respect to the use of a potentiometer, unacceptable wear of the movable contacts of the potentiometer caused by the rapid movement or dithering of the oscillating valves.

One method however which the applicant has found through experimentation to be reliable and accurate is to measure the movement, and therefore the position, of the air and gaseous fuel valves by a linear variable differential transformer (LVDT) as taught in U.S. Pat. No. 2,427,866. However, the use of such a transformer in an air-gas mixing device presents serious problems. The transformer must be installed in a manner such that it will not affect the operation of the device, and the delicate electrical wires leading to and from the transformer must not be damaged by interference with the moving components of the device nor by fatigue caused by inherent vibration of the device. Further, the wires must be connected to an external wiring harness, preferably by means of military type multi-pin connector, for transmitting the electrical signal from the LVDT to a remote measuring station or controller in a manner which will not cause the contacts to become corroded in a corrosive atmosphere and thereby cause transmission problems nor cause an explosion by arcing of the contacts during connection or disconnection of the contacts in an explosive environment. Also the connection to the external wiring harness must be made in a manner to prevent any disconnection of the contacts caused by vibration or thermal expansion of the device but yet facilitate the installation and removal of the device from the engine when desired without damaging the contacts.

SUMMARY OF THE INVENTION

Accordingly, it is an object of this invention to provide an air-gas mixing device with valve position detecting means for reliably and accurately detecting the exact position of the air and/or fuel valves and for transmitting the detection to a remote measuring station or control instrument.

It is another object of this invention to install such an detector in a simple and effective manner which will not interfere with the operation of the air-gas mixing device.

It is another object of this invention to provide a means of protecting the wiring leading to the detector within the device from being damaged by contact with moving components of the device or by vibration when the device is in operation.

A further object is to provide a means of connecting the detector to an external wiring harness through a multi-pin connector which will protect the contact pins from being corroded in a corrosive atmosphere and which will isolate the contacts from an explosive atmosphere during connection and disconnection of the contacts.

Another object is to provide such a connection means which can be mounted on and extended through an air inlet housing of the device but which will not be separated by vibration or relative movement of the housing due to thermal expansion or a change in turbo-charged air pressure to the housing.

Another object is to provide such a connection means which facilitates the removal or installation of the device from the engine when desired.

Still another object is to provide an air-gas mixer with such a valve position detecting means which is economical and feasible to manufacture.

In accordance with these objects, the invention comprises an air-gas mixing device of the type used to mix gaseous fuel with air as fuel mixture or charge for an internal combustion engine and with a detection means to detect the exact position of the air and gas valves of the device. The detection means includes a linear variable differential transformer ("LVDT") operatively connected to the air valve and another such LVDT operatively connected to the fuel valve. In each instance, a magnetic core of the LVDT is placed on a member which moves in unison with the valve, and the coils of the LVDT are coaxially spaced around the coils on a relatively stationary member such that when the valve is moved, the core moves relative to the coils which sense the change of movement and position of the core and thereby the movement and position of the moving valve.

Wires connecting the coils to an external wiring harness are routed within the mixing device in a manner to prevent contact with moving components of the device and are potted in an epoxy matrix to prevent the wires from being damaged by vibration fatigue. The outer ends of the wires within the matrix are soldered to pin-type contacts within a plastic end plug on the body of the device for connection to an external wiring harness through an interconnector which is mounted on and extends through an air inlet housing of the device.

The interconnector has pin-type contacts at each end which are connected by internal wiring. The contacts at one end of the interconnector are in electrical engagement with the contacts of the end plug, and the contacts at the other end of the interconnector are in electrical engagement with a multi-pin connector at the terminal end of the wiring harness. The interconnector is free to move within a retainer mounted on the air inlet housing and is spring loaded into engagement with the end plug to prevent any disconnection form the end plug due to vibration while allowing the mixing device to move relative to the air inlet housing in order that thermal expansion or deflection of the housing caused by a variance of turbo-charged air pressure within the housing will not adversely affect the connection.

Sealing means comprising an O-ring is provided on the lower end of the interconnector to protect the lower pin contacts against corrosion caused by a corrosive atmosphere within the air inlet housing and to guard against an explosion should the interconnector be connected or removed from the mixing device in an explosive atmosphere. Sealing means comprising an O-ring is also provided about the body of the interconnector to seal the air inlet housing from ambient air pressure.

The invention accordingly comprises the features of construction, combination of elements and arrangement of parts which will be exemplified in the construction hereinafter set forth and the scope of the invention will be indicated in the claims.

BRIEF DESCRIPTION OF THE DRAWINGS

For a fuller understanding of the nature of the objects of this invention, reference should be made to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
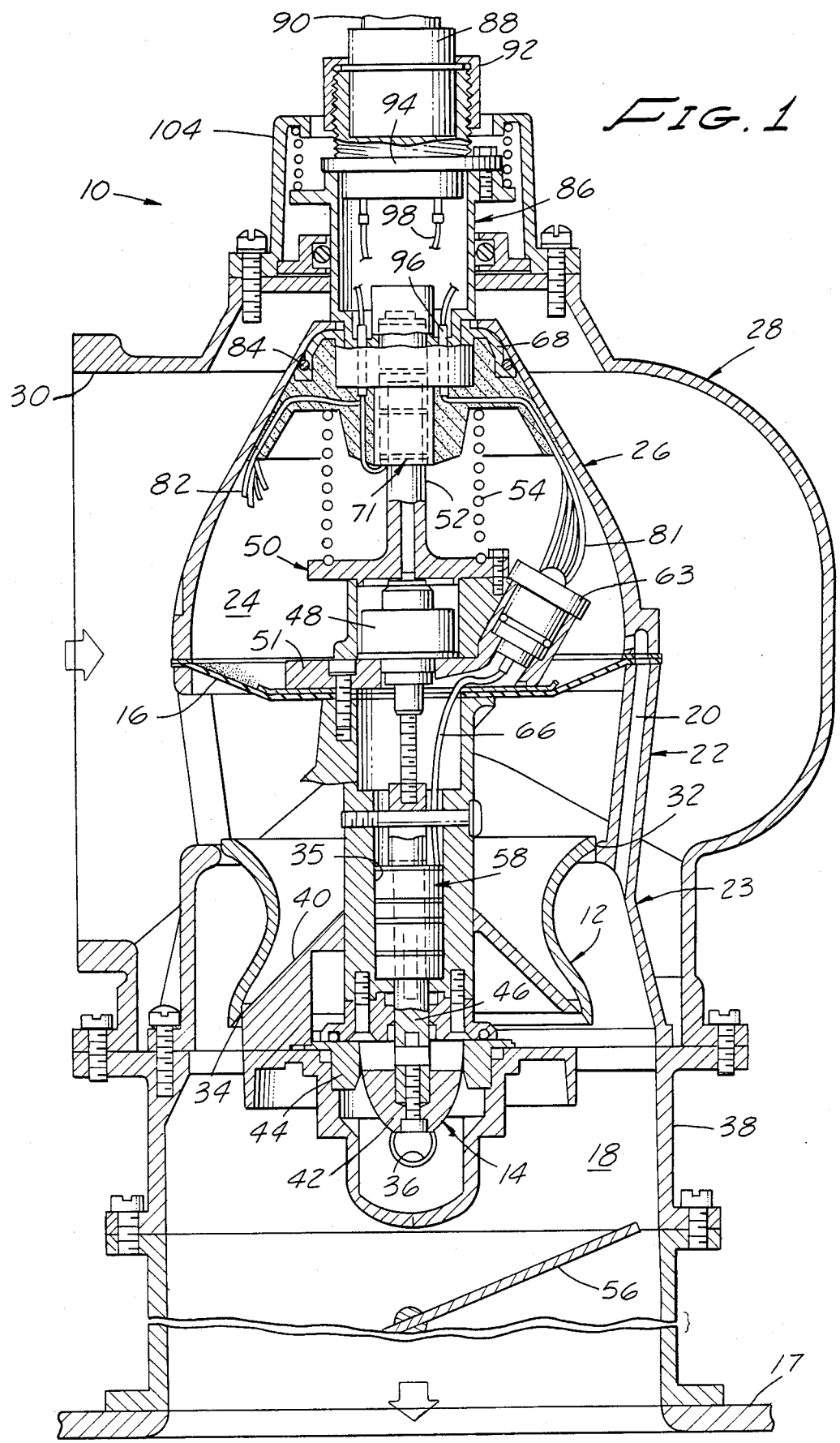
FIG. 1 is a side elevation, in cutaway axial cross-section of a preferred embodiment of an air-gas mixing device comprising this invention.

Referring to the drawings in detail, there is illustrated an air gas mixing device 10 of the type described in U.S. Pat. No. 4,694,811 with which the valve position detecting means of the instant invention is preferably used. The description and operation of the mixing device, exclusive of the improvements made by the instant invention, is generally as described in this issued patent which is incorporated herein by reference. The prior mixing device will only be described in sufficient detail below where it has been modified by the instant invention and where such description will be helpful to better understand the operation and description of the instant invention.

As shown in FIG. 1, the mixing device 10 includes an air valve 12 and gaseous fuel valve 14, also referred to at times as a gas valve, which is mounted on and moved in unison by a diaphragm 16 in response to a fluid pressure signal acting on top of the diaphragm and derived from an intake manifold 17, only a portion of which is shown, of an engine on which the mixing device is installed. The fluid pressure signal is transmitted from the a discharge outlet 18 at the base of the device, which is in communication with the intake manifold, to a vacuum pressure chamber 24 above the diaphragm via a passageway 20 within a support post 22 on body 23 of the device. The chamber is defined above the diaphragm by a rigid dome-like cover 26 which is sealed against ambient air pressure. An air inlet housing 28 surrounds the upper portion of the body of the mixing device. The housing is enclosed except for a large air inlet opening 30 on the left of the housing as viewed for the receipt of turbocharged air from an external source. The turbocharged air enters the sidewall of body 23 of the mixing device below diaphragm 16 through air intake ports between support posts 22 spaced about the periphery of the side wall. The air then passes downwardly through an air duct formed by the body of the mixing device into the air intake manifold 17 of the engine through discharge outlet 18.

The amount of air passing through the mixing device and into the discharge outlet 18 is controlled by the position of the air valve 12 relative to its upper valve seat 32 and its lower seat 34. The air valve 12 has an elongated central body portion with hollow core 35 and is attached at its upper end to the diaphragm 16 for movement with the diaphragm. As shown, the air valve is in a closed or retracted position as it would be when the engine is not operating.

Gaseous fuel enters the mixing device from a remote source through a fuel inlet 36 in an integral base 38 of the device and from there is passed beneath an internal conical section 40 of the body 23 into the air duct within the body for mixture with the passing air as a fuel charge. The amount of fuel passing through the fuel inlet and thereby mixed with the air is controlled by the fuel valve 14 and is dependent upon the position or opening of the fuel valve head 42 relative to its valve seat 44 in the fuel inlet 36.

The fuel valve head 14 is connected through a valve stem 46 to a stepper motor 48 which in turn is mounted within housing 50 to the diaphragm for movement with the diaphragm. Thus the air valve and fuel valve move in unison with the diaphragm 16. The stepper motor housing 50 is bolted to a block-like support plate 51 that in turn is clamped to the diaphragm and has at its upper end a post-like extension 52. A spring 54 is carried about the post and acts on the housing 50 to bias the diaphragm 16 and the carried air and fuel valves to their closed position as shown.

The fuel valve 14 is also independently operated by the stepper motor 48 which enables the fuel valve to be moved relative to the air valve at any given operating condition to change the air fuel mixture. This is particularly beneficial when a change is made in the type of gaseous fuel being delivered to the engine.

A conventional butterfly valve 56, only a portion of which is shown, regulates the flow rate of the air-gas mixture through the discharge outlet.

All of the above is taught by the prior art.

Figure 3:
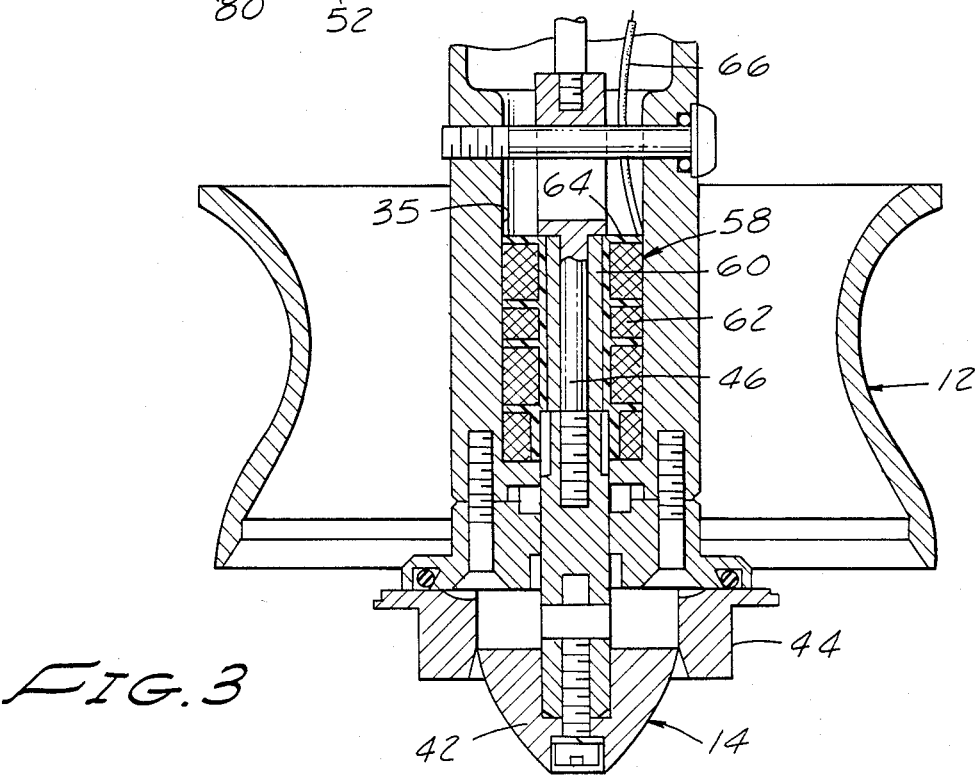
FIG. 3 is an enlarged axial cross-section of a lower portion of the fuel valve of the mixing device shown in FIG. 1, detailing the manner in which the fuel valve position LVDT is mounted to detect movement of the fuel valve.

As best seen in FIG. 3, a fuel valve position indicating means, generally designated as 58, comprising a Linear Variable Differential Transformer or LVDT is coupled to the fuel valve 14 to detect the movement of the valve. Although other types of such detectors are known, the operation and general description of the LVDT preferably used as the detecting means for the instant invention is described in U.S. Pat. No. 2,427,866. LVDTs are generally known and are used in other applications where a highly accurate measuring system is desired. However, to the best knowledge of Applicant, the mixing device of the present invention is the first such device in which an LVDT is used to measure valve movement in an air-gas mixer. An LVDT consists of a magnetic core slidable within a non-magnetic hollow spool about which a centrally located primary coil and two adjacent secondary coils are wound. An input voltage is impressed upon the primary coil and a difference of potential is transformed to the secondary coils (which are preferably substantially identical in construction and are connected in electrical opposition to each other) by electromagnetic coupling effects. The measure of the coupling effects, which is equivalent to the degree of instantaneous unbalance, is read by means of an external amplifier and measuring circuit such as an oscillograph or the like.

In the instant invention, the magnetic core 60 of the fuel valve LVDT 58 for detecting movement of the fuel valve 14 is fixably mounted to a non-magnetic portion of valve stem 46. Coils 62 of the LVDT are carried on a hollow spool 64 which is set in epoxy and fixably mounted to the interior wall of the hollow core 35 of the elongated air valve body. As the fuel valve 14 is moved by the stepper motor 48, the magnetic core 60 is moved with the fuel valve relative to the coils, and the movement and change of position is sensed by a change of potential in the coils. Electrical wires 66 connecting the LVDT to a voltage input source and to a remote measuring station through an external wiring harness are led upwardly within the hollow core 35 of the air valve body, through the diaphragm 16 and into a separable pin type connector 63 contained within a recess within stepper motor housing 50. A similar type of pin connector, not shown, is also contained within a recess on the stepper motor housing for electrical wires of the stepper motor 48. The connectors on the housing conveniently allow the cover 26 to be removed for servicing of the stepper motor or other components of the mixing device.

Figure 2:
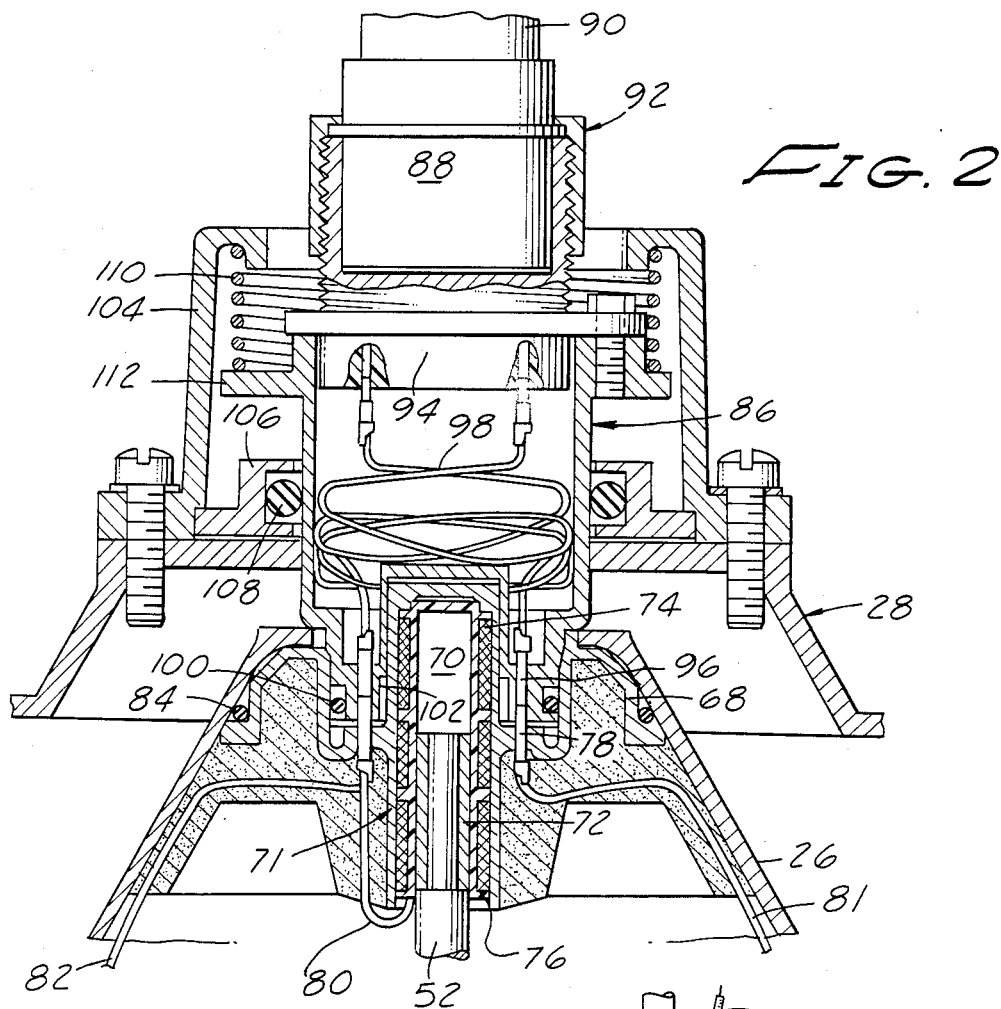
FIG. 2 is an enlarged axial cross-section of the upper-portion of the mixing device shown in FIG. 1.

An air valve LVDT 71, as generally described above, for detecting the movement and thereby the position of the air valve 12 and the means of connecting the internal wiring of the mixing device with an external wiring harness is best seen in FIG. 2. A contoured plastic end plug 68 having an elongated hollow core 70 is set within a circular opening in the chamber cover 26. The plug has an elongated hollow central core 70. A magnetic core 72 of the air valve LVDT is fixably attached to a non-magnetic portion of the post 52 of the stepper motor housing and the coils 74 of the LVDT are mounted on a hollow spool 76 which in turn is mounted within the central core 70 of the plug 68. The post and included magnetic core 72 are slidably received within the spool 76 to assist in maintaining the air valve and connected components in axial alignment with the body of the mixer during movement of the air valve. It is to be understood that since the fuel valve 14 is also connected to diaphragm 16, the air valve LVDT also detects the change of the position of the fuel valve when it moves with the air valve.

Pin Type contact pins 78, only a portion of which are shown, are embedded in a body portion of the plug 68 surrounding the central core 70. The pins 78 are of the type typically used in a multi-pin electrical connector, and the electrical wires of the air and fuel valve LVDTs and of the stepper motor 48 are soldered to the pins. Wires 80 from the coils of the air valve LVDT 71 are led directly to the pins 78. Wires 81 from the fuel valve LVDT pin connector 63 on the stepper motor housing 48 and wires 82 from the stepper motor pin connector, not shown, on the stepper motor housing are bundled and passed along the inside wall of cover 26 and underneath the top of the cover to pins 78.

After the wires are connected to the pins 78, the wires, pins and coils of the air valve LVDT are potted with a resinous insulating material, preferably epoxy, that rigidly contains the wires to avoid vibration fatigue and seals the pin contacts 78 against corrosive and combustible gases within the vacuum chamber 24. The epoxy also seals the end plug 68 to the cover 26 to provide an air-tight seal for the upper opening of the cover. An O-ring 84 is provided between the plug and the cover to retain the epoxy in its liquid state until it solidifies. The epoxy is molded in a configuration as generally shown in the drawings with a suitable recess to receive spring 54.

A generally cup-like, plastic interconnecting member or interconnector 86 interconnects the internal wires of the mixing device to a multi-pin connector 88 of an external wiring harness 90, only a portion of which is shown. The wiring harness is electrically connected to remote current source and to a remote measuring and control station for the LVDTs and stepper motor. The multi-pin connector 88 is preferably a military style connector having a threaded cap 92 for threaded engagement with a mating connecting base portion 94 which is bolted, only one bolt is shown, to the top of the interconnector 86. The cap and base portion of the connector 90 have pin type contacts which are engaged when the cap is threaded to the base, as is well known in the art.

Pin type contacts 96 are embedded in the base of the interconnector 86 and the base is suitably contoured to fit over the end plug 74 in a snug relationship and with the contact pins 96 of the interconnector engaged with the contact pins 78 of the end plug in a male/female relationship. Wires 98 are connected to the pins 96 and to pins on the base 94 of the multipin connector 88 with sufficient slack to permit the connection to be inspected by removal of the base 94 from the interconnector 86. A key and slot arrangement on the plug 68 and interconnector 86 properly aligns pins 78 and 96 on the respective members when the interconnector is inserted in the plug as shown.

An O-ring 100 positioned within a groove along the outer wall of the interconnector seals the adjacent pin contacts 78, 96 against corrosion due to any corrosive gases that may be present in the air inlet housing 28 and also seals the contacts against explosive gases that may be present in the air inlet housing and which could be exploded by an electrical arc that may occur during connection or disconnection of the pins. Advantageously, a space 102 is provided between the plug and connector and adjacent to the contacts to provide an air pocket to minimize pressure buildup during connection.

After the interconnector 86 is inserted into electrical engagement with the plug 68 as shown, the interconnector is retained to the upper surface of the air inlet housing 28 by a retaining member 104 which is bolted to the top of the air inlet housing. The retainer has a differentially shaped central opening such that the lower portion of the retainer will fit over the interconnector but the interconnector cannot pass through the upper end of the retainer. A support plate 106 for containing an O-ring 108 is clamped by a portion of the retaining member 104 to the air inlet housing when the retainer is bolted to the housing. The O-ring 108 seals the air inlet housing against air leakage around the body of the interconnector.

The interconnector 86 is biased downwardly into electrical connection with the end plug by a retaining spring 110 positioned between an underhanging lip of the retainer 104 and an integral flange 112 of the interconnector but is free to move axially within the retainer.

In operation, movement of the air and fuel valves by diaphragm 16 causes the core 72 of the air valve LVDT 71 to move relative to its cooperating coils 74, producing a voltage change in the secondary coils. The change, which is an indication of the change in position of the valves, is measured by a remote measuring device where the change in position is displayed. In the event external engine performance detectors, such as exhaust gas emission measurements and the like, detect that the air-gas mixture is not at its optimum, stepper motor 48 is energized to move the fuel valve to a position which will produce such an optimum mixture. The change in position of the fuel valve 14 by the stepper motor is detected by the fuel valve LVDT 58 as core 60 moves relative to coils 62 when the fuel valve is moved by the stepper motor. With a computer system, the respective positions of the fuel valve and air valve may be automatically monitored, compared with an engine performance indicators, and the fuel valve position adjusted automatically in response to the performance.

The ability to detect at any time the position of the air and fuel valves is particularly advantageous when changing from one gaseous fuel to another during the performance of the engine. When a different supply of gas is delivered to the engine, and with the exact position of the air valve being known, the fuel valve may be quickly moved to a predetermined position relative to the air valve to change the air-gas mixture for the particular BTU content of the newly supplied fuel.

Although it is preferred to have the flow of fuel controlled by fuel valve located within the mixing device, it should be understood that the fuel flow, and thereby the air-gas mixture, may also be controlled by an external valve located in the fuel supply line to the mixer. In such an event, it may only be necessary to monitor the position of the air valve.

The invention has other advantageous features. The manner of positioning the LVDTS and routing of the wires to them provide for an ease of installation which does not interfere with the operation of the mixing device and which protects the wires from being damaged by interference with the moving parts of the mixer and by fatigue. The external connection with the aid of the interconnector enables the mixer to be quickly installed to a multi-pin connector of the type desired by the industry. The manner of connection also prevents the interconnector from being disconnected from the plug due to vibration and the like while allowing the air inlet housing to move relative to the interconnector due to thermal expansion or a change in the turbo-charged air to the housing. It has been found that the housing wall will flex with such a change in the air pressure and if not compensated for, such a change could cause a disconnection of the contacts.

Further the electrical contacts are protected from being corroded by a corrosive atmosphere and means are provided to guard against an explosion caused by arcing of the contacts in an explosive atmosphere.

This invention is not be limited by the embodiments shown in the drawings and described in the description which is given by way of example and not by limitation, but only in accordance with the scope of the appended claims.

I claim:

1. An air gas mixing device of the type used to mix gaseous fuel with air as an air-fuel mixture for discharge into an air intake conduit means of an internal combustion engine, comprising:

a body having an air duct extending through the body, the air duct having an air inlet and an air-fuel mixture discharge outlet downstream of the air inlet in the direction of fluid flow, the body arranged to be connected to the air intake conduit means of the engine so that the discharge outlet of the air duct is in communication with said intake conduit means;

a moveable air valve for controlling the rate of air flow through said air duct;

a fuel inlet in communication with said air duct for delivery of gaseous fuel for mixture with air flowing through said air duct;

a moveable fuel valve for controlling the rate of fuel flow through said fuel inlet; and air valve position detecting means for detecting the movement and thereby the position of the air valve, said detecting means including coaxially spaced primary and secondary electromagnetic coils, said primary coil adapted for connection to a source of alternating current and the secondary coils adapted for connection to a remote measuring instrument, and a magnetic core operatively mounted within said coils for axial movement relative thereto and for movement in unison with the air valve whereby movement of the air valve causes the core to move relative to the coils and produce a change of voltage in the secondary coils that is measurable by the remote measuring instrument as a change in position of the air valve.

2. The device of claim 1 wherein said magnetic core is operatively mounted for movement in unison with both the air valve and fuel valve and said air valve position detecting means detecting the movement and thereby the position of both valves.

3. The device of claim 1 further including an electro-mechanical operator for moving the fuel valve independently of the air valve and fuel valve position detecting means for detecting the movement of the fuel valve and thereby the position of the fuel valve, said fuel valve position detecting means including coaxially spaced primary and secondary electromagnetic coils, said primary coil of the fuel valve detection means adapted for connection to a source of alternating current and the secondary coils of the fuel valve detection means adapted for connection to a remote measuring instrument, and a fuel valve magnetic core operatively mounted within said coils for axial movement relative thereto and in unison with movement of the fuel valve whereby movement of the fuel valve causes the fuel valve core to move relative to the coils and produce a change of voltage in the secondary coils of the fuel valve detection means that is measurable by the remote measuring instrument as a change in position of the fuel valve.

4. The device of claim 1 further including an air inlet housing about a portion of the body of the device for the receipt of turbo-charged air and connection means for connecting the detection means to an external wiring harness, said connection means comprising:
 an end plug in the body of the device having terminal electrical contacts in electrical connection with the detection means;
 an interconnector external to the body of the device and extending through the air inlet housing, the interconnector having at one end electrical contacts for engagement with the contacts in the end plug and having at another end electrical contacts for engagement with electrical contacts of the wiring harness and said contacts of the interconnector being interconnected by wiring means;
 sealing means for sealing the contacts between the end plug and the interconnector from a corrosive atmosphere for the prevention of corrosion to the contacts and from an explosive atmosphere for the prevention of an explosion caused by arcing of the contacts during connection or disconnection of the contacts;
 spring means for biasing the interconnector into electrical engagement with the end plug;
 a retainer for retaining said interconnector to the air inlet housing; and
 said intreconnector being retained within the retainer in a manner to permit relative movement of the interconnector within the retainer.

5. An air gas mixing device of the type used to mix gaseous fuel with air as an air-fuel mixture for discharge into an air intake conduit means of an internal combustion engine, comprising:
 a body having an air duct extending through the body, the air duct having an air inlet and an air-fuel mixture discharge outlet downstream of the air inlet in the direction of fluid flow, the body arranged to be connected to the air intake conduit means of the engine so that the discharge outlet of the air duct is in communication with said intake conduit means;
 a moveable air valve for controlling the rate of air flow through said air duct;
 a fuel inlet in communication with said air duct for delivery of gaseous fuel for mixture with air flowing through said air duct;
 a moveable fuel valve having a valve stem in operative arrangement with the fuel inlet for controlling the rate of fuel flow through said fuel inlet;
 an electro-mechanical operator for moving the fuel valve relative to the fuel inlet and independently of the air valve;
 an air inlet housing for transfer of air to the air inlet of the body;
 air valve position detecting means coupled to the air valve for detecting the movement and thereby the position of the air valve, said detection means including coaxially spaced primary and secondary electromagnetic coils, said primary coil adapted to receive a source of alternating current and the secondary coils adapted for connection to a remote measuring instrument, and a magnetic core operatively mounted within said coils for axial movement relative thereto and for movement in unison with the air valve whereby movement of the air valve causes the core to move relative to the coils and produce a change of voltage in the secondary coils that is measurable by the remote measuring instrument as a change in position of the air valve;
 fuel valve position detecting means for detecting the movement of the fuel valve and thereby the position of the fuel valve, said fuel valve detection means including coaxially spaced primary and secondary electromagnetic coils, said primary coil of the fuel valve detection means adapted for connection to a source of alternating current and the secondary coils of the fuel valve detection means adapted for connection to a remote measuring instrument, and a magnetic core operatively mounted on the valve stem of the fuel valve within said fuel valve detection coils for axial movement relative thereto and for movement in unison with the fuel valve whereby movement of the fuel valve causes the core on the fuel valve stem to move relative to the coils and produce a change of voltage in the secondary coils that is measurable by the remote measuring source as a change in position of the fuel valve;
 an end plug in the body of the device having terminal electrical contacts in electrical connection with internal wiring within the body leading to the detection means,
 an interconnector external to the body of the device and having at one end electrical contacts for engagement with the contacts in the end plug and having at another end electrical contacts for engagement with electrical contacts of the wiring harness and said contacts of the interconnector being interconnected by wiring means;
 sealing means for sealing the contacts between the end plug and the interconnector from a corrosive atmosphere for the prevention of corrosion to the contacts and from an explosive atmosphere for the prevention of an explosion caused by arcing of the contacts during connection or disconnection of the contacts;

spring means for biasing the interconnector into electrical engagement with the end plug;

a retainer for retaining said interconnector to the air inlet housing; and said interconnector confined within said retainer and adapted to move relative to said retainer.

6. An air gas mixing device of the type used to mix gaseous fuel with air as an air-fuel mixture for discharge into an air intake conduit means of an internal combustion engine and having a body with internal electrical wiring connected to an external wiring harness, the improvement comprising connection means for connecting said internal wiring to an external wiring harness, said connection means comprising:

an end plug in the body of the device having terminal electrial contacts connected to the internal wiring;

an interconnector external to the body of the device and extending through an air inlet housing of the device, the interconnector having electrical contacts for engagement with the contacts in the end plug and having at another end electrical contacts for engagement with electrical contracts of the wiring harness and said contacts of the interconnector being interconnected by wiring means;

sealing means for sealing the contacts between the end plug and the interconnector from a corrosive atmosphere for the prevention of corrosion to the contacts and from an explosive atmosphere for prevention of an explosion caused by arcing of the contacts during connection or disconnection of the contacts;

spring means for biasing the interconnector into electrical engagement with the end plug; and a retainer for retaining said interconnector to the air inlet housing and adapted to move relative to said interconnector.

7. The device of claim 6 further including sealing means about the interconnector for sealing the air inlet housing.

8. The device of claim 6 wherein said sealing means for sealing the contacts between the end plug and the interconnector comprises an O-ring positioned between the end plug and interconnector adjacent to the contacts.

* * * * *